United States Patent [19]

Stefansky et al.

[11] Patent Number: 4,979,062
[45] Date of Patent: Dec. 18, 1990

[54] DISK DRIVE ARCHITECTURE

[75] Inventors: Frederick M. Stefansky; Glade N. Bagnell, both of Longmont, Colo.

[73] Assignee: Conner Peripherals, Inc., San Jose, Calif.

[21] Appl. No.: 464,696

[22] Filed: Jan. 18, 1990

Related U.S. Application Data

[63] Continuation of Ser. No. 56,584, May 29, 1987, abandoned.

[51] Int. Cl.$^5$ .......................... G11B 5/012; G11B 5/00
[52] U.S. Cl. .................................. 360/97.02; 360/137
[58] Field of Search ............... 360/97.01, 97.02–97.04, 360/98.1, 69, 71, 36, 137

[56] References Cited

U.S. PATENT DOCUMENTS

| | | | |
|---|---|---|---|
| 4,553,183 | 11/1985 | Brown et al. | 360/98 |
| 4,639,863 | 1/1987 | Harrison et al. | 364/708 X |
| 4,685,303 | 8/1987 | Branc et al. | 360/69 X |
| 4,692,827 | 9/1987 | Biermeier et al. | 360/97 |
| 4,713,714 | 12/1987 | Gatti et al. | 360/97 X |
| 4,714,972 | 12/1987 | Biermeier et al. | 360/97 |

Primary Examiner—John H. Wolff
Attorney, Agent, or Firm—Fliesler, Dubb, Meyer & Lovejoy

[57] ABSTRACT

A disk drive assembly which is resistant to physical shocks and thermally caused distortion, including an end plate, a casing attached to the end plate, and a base plate enclosed in the casing and mounted to the end plate. The end plate supports a rotatable disk and an actuator assembly for reading information from and recording information on the disk. The end plate and the casing form a seal to provide a controlled environment within the casing and the base plate is attached to the end plate in the controlled environment.

5 Claims, 11 Drawing Sheets

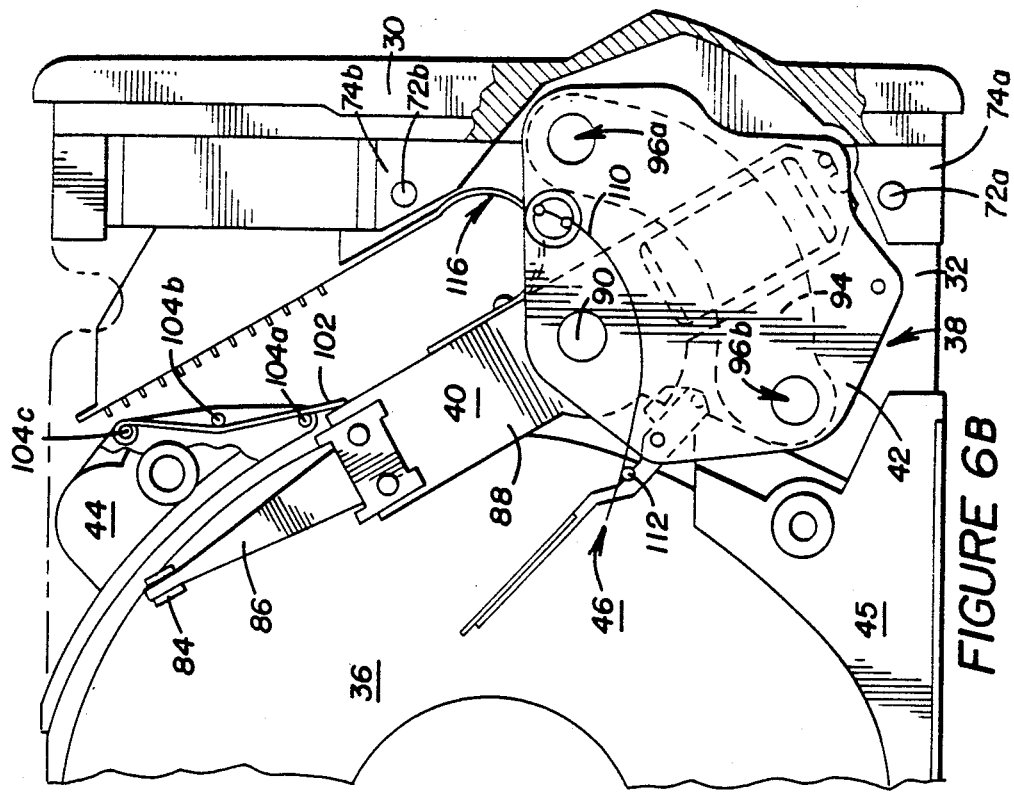
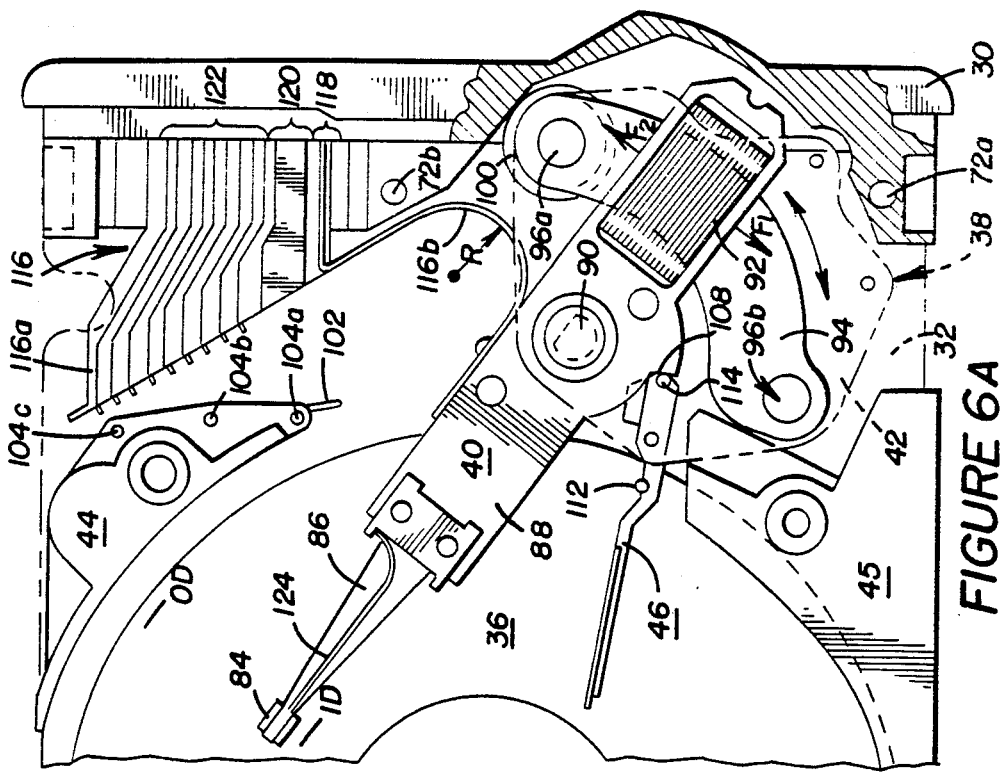

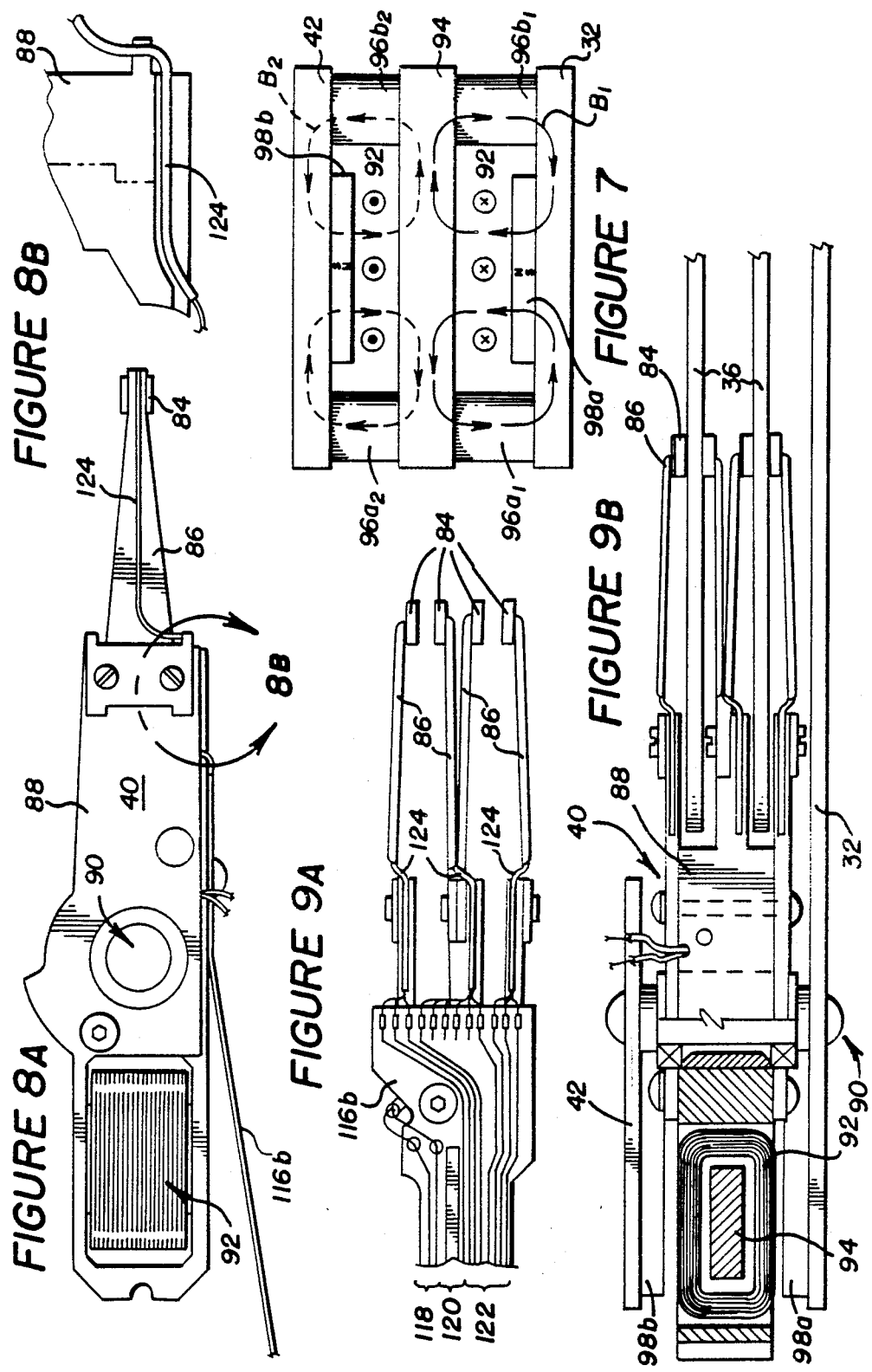

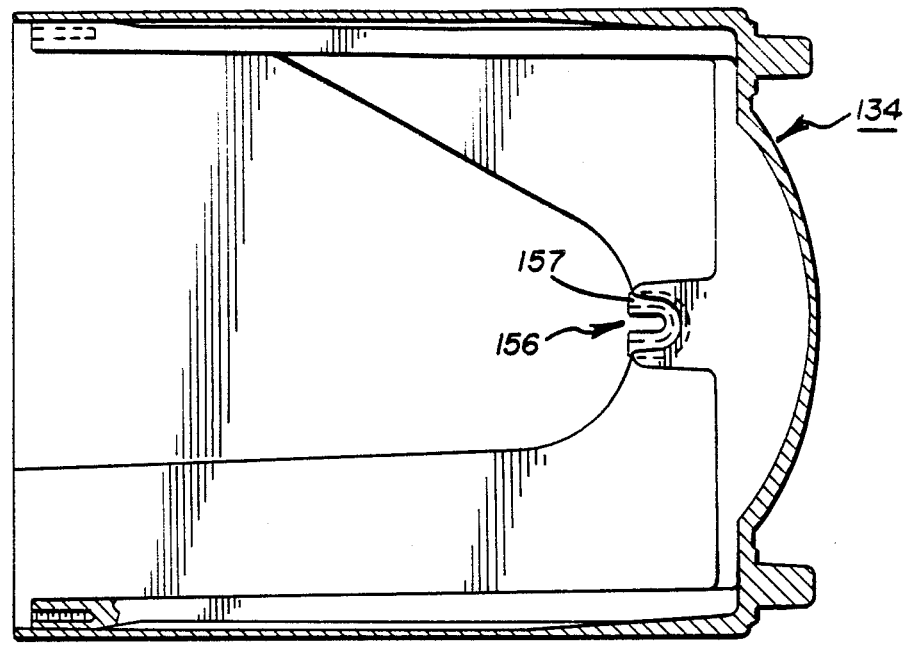
FIGURE 12
FIGURE 13A
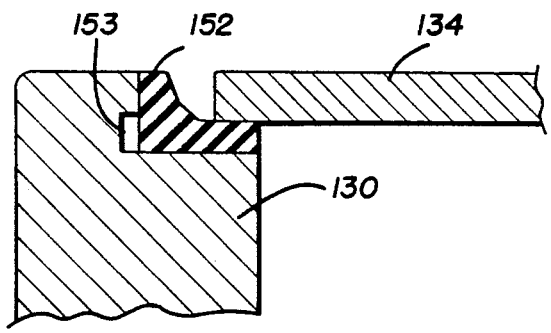
FIGURE 13B
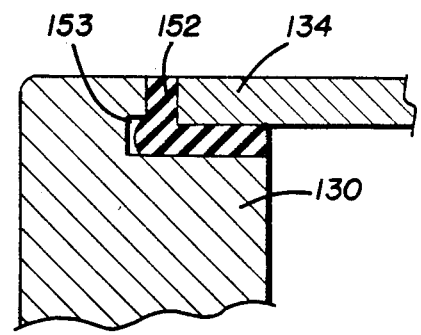

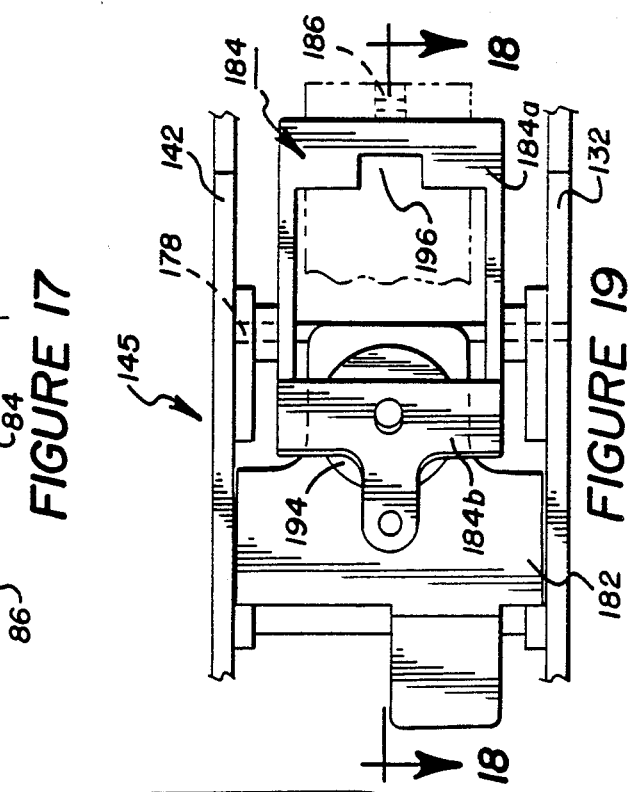
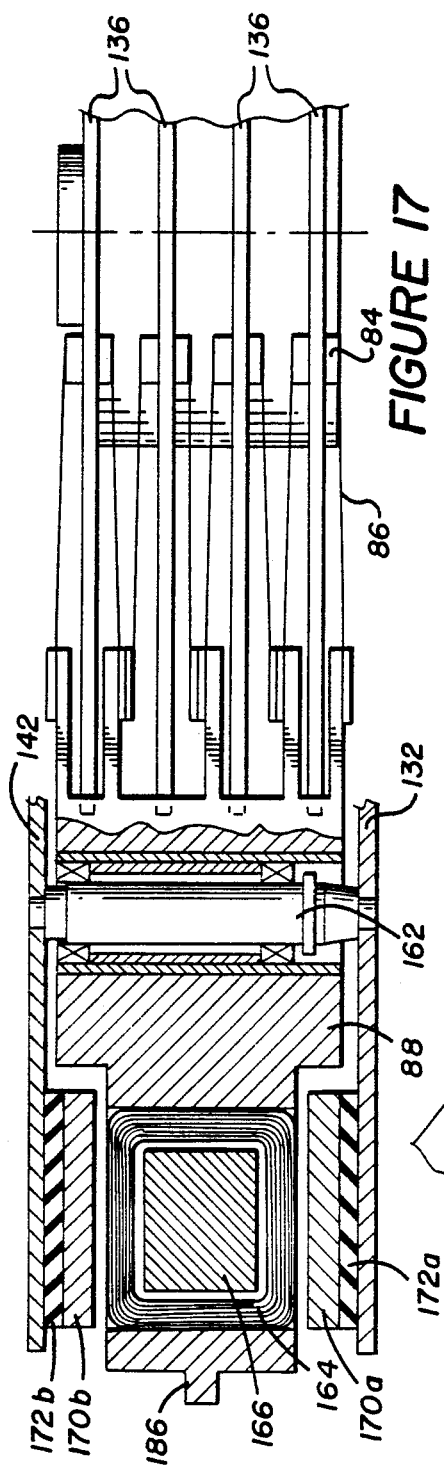
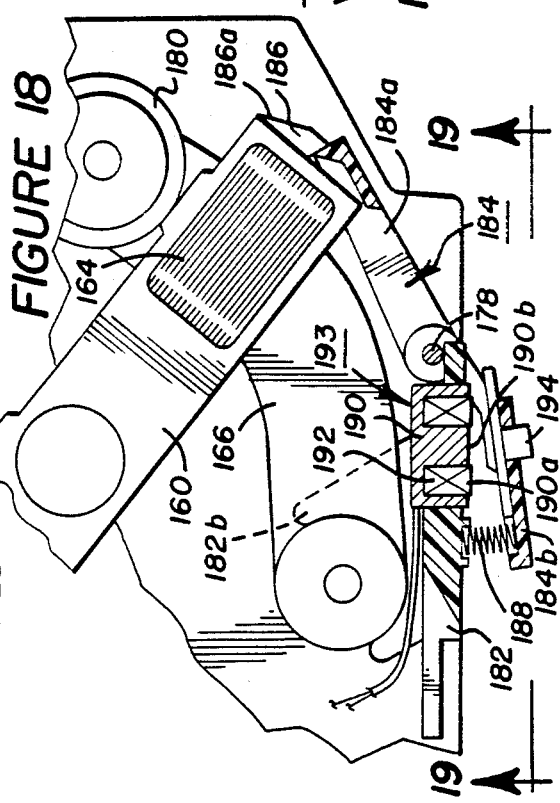

DISK DRIVE ARCHITECTURE

This application is a continuation of Ser. No. 056,584, filed May 29, 1987, now abandoned.

CROSS-REFERENCE TO RELATED APPLICATION (1) ACTUATOR FOR DISK DRIVE, inventor Frederick Mark Stefansky, Ser. No. 056,602, filed May 29, 1987;

(2) LATCH MECHANISM FOR DISK DRIVES; inventors Frederick Mark Stefansky and Glade N. Bagnell, Ser. No. 056,142, filed May 29, 1987;

(3) DISK DRIVE SYSTEM CONTROLLER ARCHITECTURE, inventors John P. Squires, Tom A. Fiers, and Louis J. Shrinkle, Ser. No. 057,289, filed June 2, 1987;

(4) DISK DRIVE SOFTWARE SYSTEM ARCHITECTURE, inventors John P. Squires, Tom A. Fiers, and Louis J. Shrinkle, Ser. No. 057,805, filed June 2, 1987; and (5) DISK DRIVE SYSTEM CONTROLLER ARCHITECTURE UTILIZING EMBEDDED REAL TIME DIAGNOSTIC MONITOR, inventor John P. Squires, Ser. No. 058,289, filed June 2, 1987.

BACKGROUND OF THE INVENTION

1. Field of the Invention.

The present invention relates to disk drives.

2. Description of the Related Art.

Developments in personal computers, portable computers and lap top computers have prompted reductions in the size and increases in memory capacity of disk drives. Existing disk drives, however, suffer from several disadvantages, and attempts to provide further reductions in size, and weight and increases in durability and memory capacity have been hampered by these disadvantages.

Existing disk drives require a large number of mechanical parts. Each additional part in a disk drive represents an increase in the possibility and probability of the mechanical failure of the drive. Furthermore, each part in a disk drive represents an increase in the the weight of the drive and the space occupied by the drive, and the decrease in the ability of the drive to survive physical shocks and vibrations.

Resistance to physical shocks and vibrations is critical to protecting the disk or disks, the head or heads, and the various bearings in a disk drive from damage; in particular, damage to the disks which can cause a loss of data, and damage to the heads or the bearings which can end the life of a drive, resulting in a total loss of data. Prior disk drives, however, have limited resistance to physical shocks.

Another problem with prior disk drives is the difficulty in sealing the drive to protect the disks from contaminants. This difficulty arises from the large area which must be sealed to protect the environment where the disk resides and from the large number of points at which access is provided to the environment in which the disk resides. These access points are utilized to bring to the interior of the disk drive electrical circuits which provide current to the motor which rotates the disk, transmit data signals to and from heads which read and record information on the disks, and in some instances, provide current to a voice coil for positioning the head (or heads) with respect to the disk or disks.

Many of these disadvantages of prior disk drives are attributable to the casing—a three-dimensional casting or so-called "toilet bowl"—in which the disks reside. Such a casing is a large, three dimensional piece of cast metal, usually aluminum, having a round portion where the disks reside—hence the name "toilet bowl." A top plate covers the entire open top of the casing, forming a seal therewith. The seal between the casing and the cover has a large area due to the large opening at the top of the casing. Furthermore, the spindle on which the disks rotate extends through both the casing and the cover.

Both the seal and the protrusion of the spindle through the casing and the cover provide possible points of entry for contaminants. Further, in disk drives using stepper motors to position the heads with respect to the disk, the stepper motor is located outside of the casing, requiring another seal between the stepper motor and the casing. Acknowledging the existence of points where contaminants can enter the disk drive, manufacturers of conventional disk drives provide a breather filter and design the disk drives so that the rotation of the disks causes the disk drives to exhaust air through leaks in the seals and to intake air only through the filter provided in the breather filter. However, a fairly course filter must be provided in the breather filter for a flow of air to exist, and thus contaminants can enter the disk drive through the filter paper.

A cast casing is difficult to manufacture with precision, particularly the location of mounting points for elements of the drive supported by the casing. Mounting holes must be drilled after the casing is cast, and the mounting holes must be aligned with the casing and with each other. More importantly, however, a three-dimensional, cast casing flexes due to thermal stresses. Flexing of the casing causes tracking problems by moving the heads, which are mounted at one point on the casing, relative to the disk, which is mounted at another point on the casing. In multi-disk disk drives the heads associated with different disks can move relative to the disks to the point where different heads are in different cylinders—a cylinder being defined as a vertical segment representing the same track on the respective disks. This problem is compounded by increased track densities.

An additional problem associated with known disk drives is their susceptibility to damage caused by physical shocks. This susceptibility to damage is attributable, at least in part, to the fact that the spindle on which the disks rotate is mounted directly to the cast casing.

In conventional disk drives having a cast casing and utilizing a voice coil to position the head with respect to the disk, the voice coil is a unit with a large number of elements including a permanent magnet to provide a magnetic field, separate pieces of magnetically permeable material which provide a return for the magnetic field, and a coil for carrying an electric current; the aluminum casing is not magnetically permeable and cannot be utilized as a return for the magnetic field. The separate pieces of magnetically permeable material add weight and complexity to the disk drive and require additional space. Further, the permanent magnet is mounted vertically, i.e., in a plane perpendicular to the plane of the disks, and to maintain a constant spacing between the magnet and the coil, which is mounted on a pivoting arm, the magnet must be curved, increasing manufacturing cost and difficulty.

Various types of locking (or latch) devices have been used to lock the arm of a voice coil in a particular position when the disk drive is not operating. The trend in latch devices is to utilize a high power unit which is separately assembled to provide reliability. However, high power latch devices generate a large amount of heat which is not desirable in a disk drive or any other area in a computer. Further, the operation of conventional latch devices can be position dependent. Thus, the orientation of the disk drive could effect the reliability of the latch device.

SUMMARY OF THE INVENTION

It is, therefore, an object of the present invention to provide a disk drive assembly having a small number of mechanical elements.

A further object of the present invention is to provide a disk drive assembly which is resistant to damage from physical shocks.

Another object of the present invention is to provide a disk drive in which the relative positions of the heads and the disks are unaffected by thermal or physical stresses.

Another object of the present invention is to provide a disk drive assembly having a seal with a small area to maintain the disk in a controlled environment.

Another object of the present invention is to provide a disk drive having an internal air filtration system.

Another object of the present invention is to provide a disk drive assembly in which a single electrical connector transfers all electrical currents and data signals from the environment in which the disks reside to the exterior of the environment.

The present invention is directed to a disk drive assembly including an end plate, a cover attached to the end plate, and support means (a base plate) enclosed in the casing and mounted to the end plate. The base plate supports a rotatable disk and read and record means for reading information from and recording information on the disk. A gasket provides a seal between the end plate and the cover. The cover includes an attachment point, and the base plate is supported by the casing at the attachment point. A top plate is mounted on the base plate and the read and record means comprises an actuator arm pivotably mounted between the top and base plates for supporting the heads and electromagnetic means for pivoting the actuator arm. The electromagnetic means may comprise a voice coil assembly, in which case the top and bottom plates function as returns for the magnetic field generated by magnets associated with the voice coil assembly.

A specific advantage of the present invention is that the base plate, to which the disk and the read and write means are mounted, is a two-dimensional plate which can be precisely manufactured, thereby providing for an accurate positioning of the components supported on the base plate. The use of the base plate provides a single structural component within the sealed environment of the casing to which all other components can be mounted, alleviating the problems associated with the unpredictable thermal flexing of a three-dimensional structural component and the use of any mounting screws protruding through the casing. The base plate provides the disk drive of the present invention with structural rigidity, preventing misalignment of the heads and the disks; as a consequence, higher track densities can be utilized and more data can be stored on a disk. In addition, the base plate can be manufactured by stamping rather than casting.

A further advantage of the present invention is that the seal between the end plate and the casing has a small area, and that a single electrical connector transfers all electrical signals between the exterior and the interior of the casing, thereby reducing the possibility of the introduction of contaminants to the controlled environment within the casing. Importantly, the disk drive of the present invention does not require a breather filter.

Another advantage of the present invention is that the disk drive assembly is resistant to damages caused by physical shock and vibration.

Another advantage of the present invention is that the small number of mechanical parts reduces the possibility of breakdowns due to mechanical failures.

A further advantage of the present invention is that the disk drive assembly has a reduced size with respect to conventional disk drives utilizing disks of approximately the same diameter.

BRIEF DESCRIPTION OF THE DRAWINGS

FIGS. 1-10 illustrate a first embodiment of the disk drive of the present invention. In particular:

FIG. 1 is an isometric view of a disk drive according to the first embodiment of the present invention;

FIG. 2 is an exploded view showing the hard disk assembly, the shock frame, and the circuit board comprising the disk drive of the present invention;

FIG. 3A is a partial sectional view showing the mounting of the hard disk assembly to the shock frame and showing the mounting of the base plate on the end plate;

FIG. 3B is a sectional view of the interface of the end plate and the casing of the hard disk assembly;

FIG. 4 is a partial cutaway view of the casing;

FIG. 5 is an isometric view of the end plate and the base plate;

FIGS. 6A and 6B are plan views of the actuator assembly;

FIG. 7 is a cross sectional view for explaining the magnetic fields in the electromagnetic means of the voice coil assembly;

FIGS. 8A and B are top views of the actuator arm assembly;

FIG. 9A is a side view of the actuator arm assembly;

FIG. 9B is a side, partial sectional view of the actuator arm assembly; and

FIG. 10 is an exploded view of the actuator assembly.

FIGS. 11-19 illustrate a second embodiment of the disk drive of the present invention. In particular:

FIG. 11 is an exploded, isometric view of a disk drive according to the second embodiment of the present invention;

FIG. 12 is a sectional view of the casing for the disk drive;

FIGS. 13A and B are sectional views showing the seal between the casing and end plate;

FIGS. 14 and 15 are plan views of a portion of the hard disk assembly;

FIG. 16 is an exploded view of the actuator assembly;

FIG. 17 is a side, sectional view of the actuator arm;

FIG. 18 is a top, partial sectional view of the latch mechanism; and

FIG. 19 is a side view of the latch mechanism.

DESCRIPTION OF THE PREFERRED EMBODIMENTS

Two embodiments of a disk drive according to the present invention will be described with reference to FIGS. 1-19. The disk drive described herein includes a hard disk assembly incorporating various numbers of hard disks and utilizing Winchester technology; however, the disk drive of the present invention may utilize other types of disks, for example, optical disks, and other read/write technologies, for example, lasers. The diameter of the disks utilized in the disk drive of the present invention have a diameter on the order of 3.75 inches, or so-called "3.5 inch" disks; however, the disk drive of the present invention can be used with any diameter disk whether larger or smaller than 3.75 inches.

A disk drive according to a first embodiment of the present invention will be described with reference to FIGS. 1-10.

Figure 1:
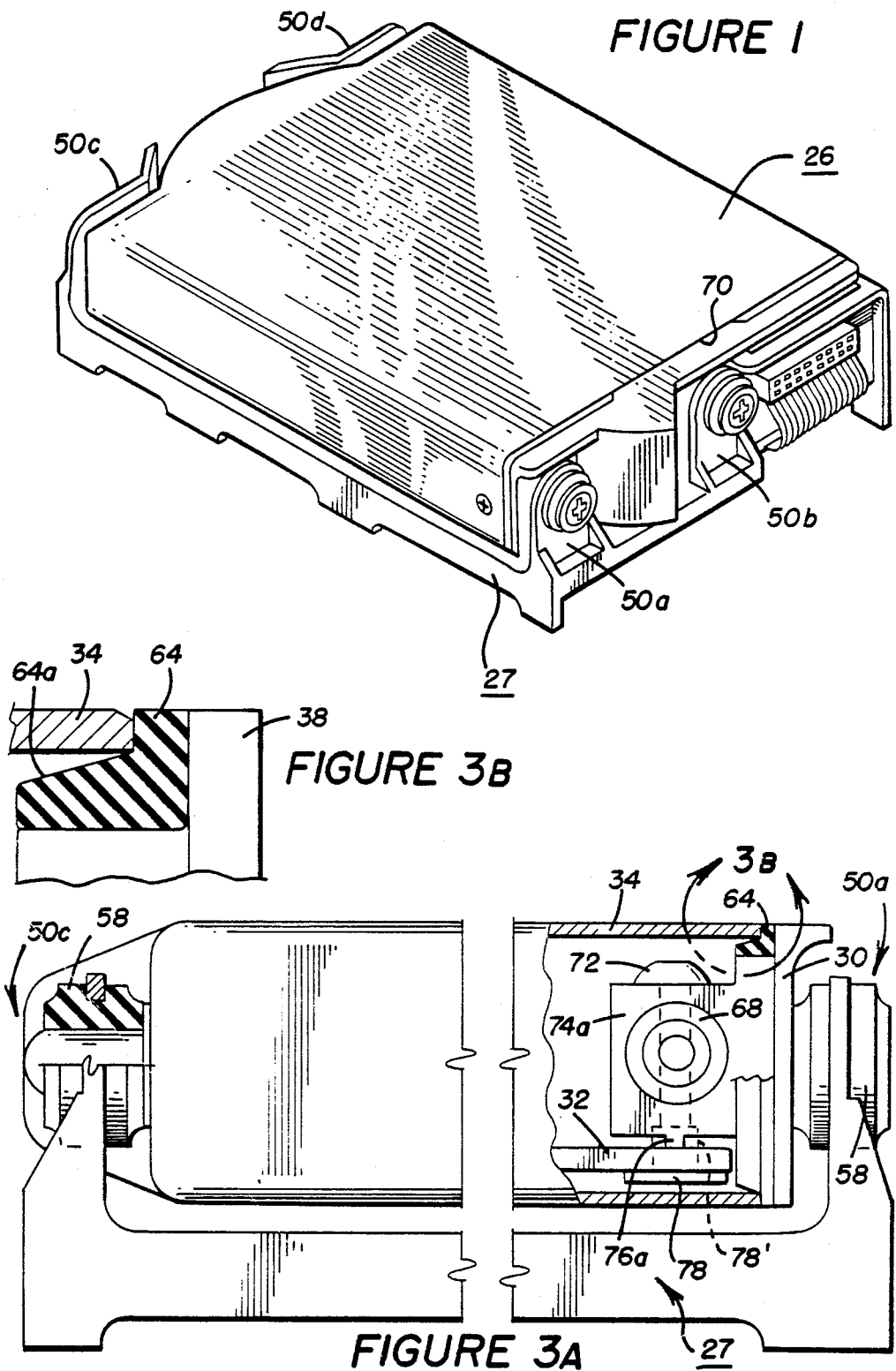
Figure 2:
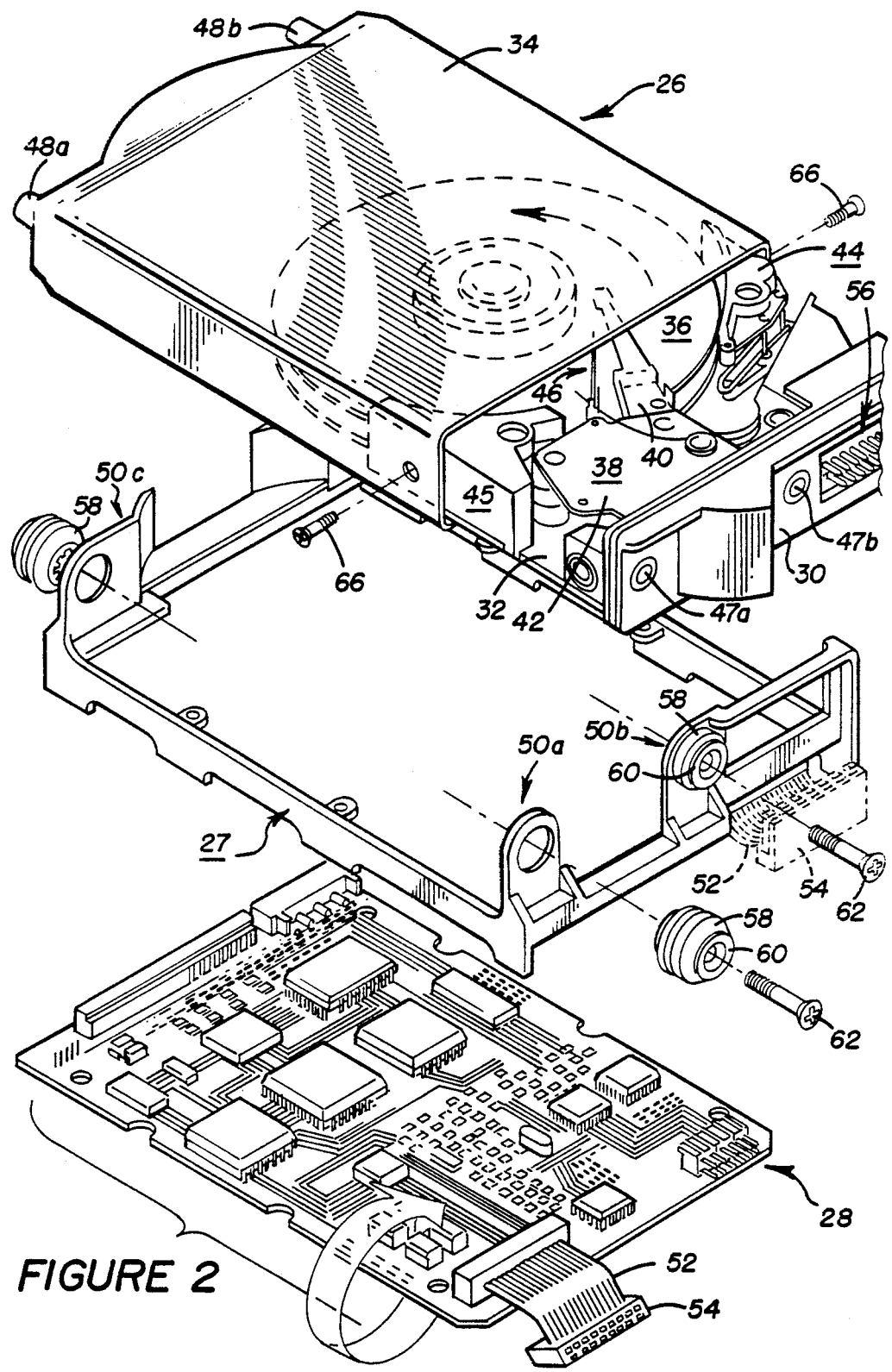
Figure 5A:
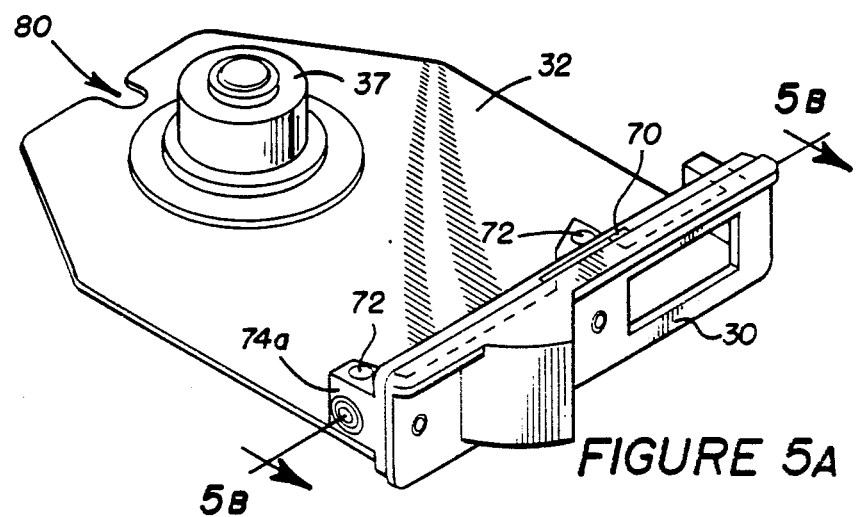

As shown in FIGS. 1 and 2, a disk drive according to the present invention includes a disk assembly 26, a shock frame 27 on which the disk assembly 26 is mounted, and a printed circuit assembly 28 mounted on the shock frame 27. Briefly, the disk assembly 26 includes an end plate 30, a base plate 32 mounted to the end plate 30, and a casing 34 mounted to and forming a seal with the end plate 30 to provide a controlled environment within the casing 34. Hard disks 36, two disks in the first embodiment, are rotatably mounted to the base plate 32 via a motor 37 (FIG. 5A). An actuator assembly 38 includes arm assembly 40 pivotably mounted between the base plate 32 and a top plate 42, the top plate 42 itself being mounted to the base plate 32. Outside diameter crash stop 44 and filter assembly 45 are mounted on the base plate 32, and latch 46 is pivotably mounted between the top and base plates 42, 32.

The disk assembly 26 is mounted to the shock frame 27 via attachment points 47a-b in the end plate and two posts 48a-b on the casing 34. End plate attachment points 47a-b are attached to the frame 27 at mounting points 50a-b, respectively, and mounting tabs 48a-b are connected to the shock frame 27 at mounting points 50c-d. Each mounting point 50a-d on shock frame 27 has an aperture into which grommets 58 are inserted. Posts 48a-b on casing 34 are inserted directly into the grommets 58 in mounting points 50c-d, respectively, whereas shock spools 60 are inserted in the grommets 58 in mounting points 50a-b and mounting screws 62 are inserted through the shock spools 60 and threaded into attachment holes 47a-b of end plate 30.

The printed circuit assembly 29 (shown in an inverted position in FIG. 2) is also attached to the shock frame 27. A single bus 52 carries all of the electrical signals from the printed circuit assembly 28 to the disk assembly 26 via a connector 54 and header 56 in the end plate 30. Further, bus 52 has only twenty (20) pins due to the fact that a DC motor requiring only three (3) leads is utilized. Such a motor is described in U.S. patent application Ser. No. 163,222, entitled METHOD AND APPARATUS FOR BRUSHLESS DC MOTOR SPEED CONTROL, filed Feb. 26, 1988, inventors Squires, et al. assigned to the Assignee of the subject application.

The disk drive of the first embodiment of the present invention has the following outline dimensions: Height 1.5" (3.81 cm); Length 5.75" (14.61 cm); and Width 4.0" (10.61 cm), and a total weight of 1.2 pounds. Thus, the disk drive of the present invention is one-half (½) of the size of a one-half (½) height 5¼" inch disk drive.

Figure 4:
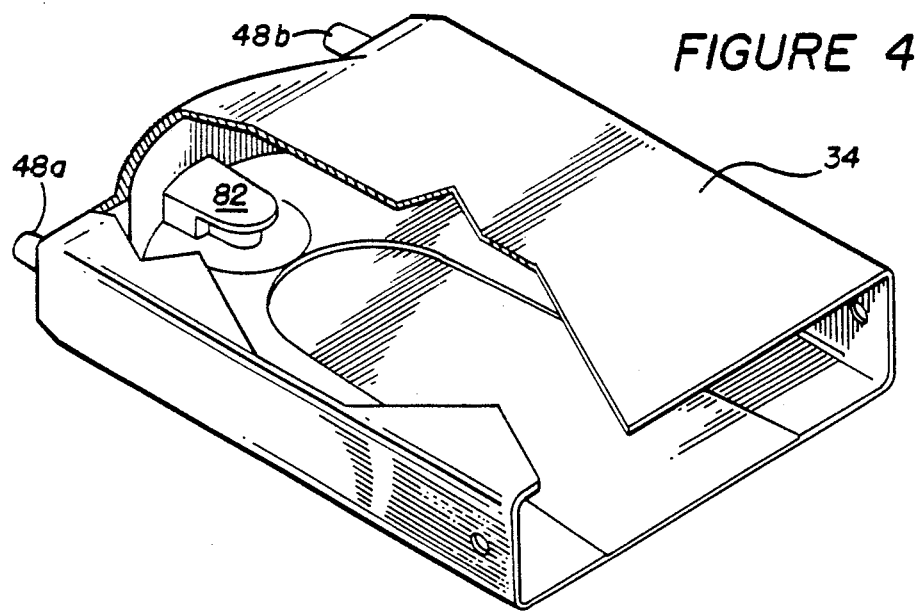

The interrelationship of the end plate 30, the base plate 32, and the cover 34, as explained below with reference to FIGS. 3-5, provides a disk assembly 26 with a resistance to distortion caused by physical and thermal stresses and provides a controlled environment within the casing.

A seal is formed between the end plate 30 and casing 34 by a gasket 64. The partial, cross-sectional view of FIG. 3B shows the end plate 30, the casing 34, and the gasket 64 when the seal is formed. Gasket 64 has a sloped portion 64a which facilitates the assembly of end plate 30 and casing 34. Specifically, the opening of casing 34 is designed to expand slightly as the edge of the casing 34 slides up the sloped portion 64a of the gasket 64. Screws 66 hold the casing 34 to the end plate 30, and o-rings 68 provide a seal around mounting screws 66. Gasket retainers 70 (FIG. 5A) are provided at the top and bottom of end plate 30 to maintain the proper positioning of gasket 64. It has been found that the gasket retainers 70 are necessary when the disk assembly 26 is placed in an environment where the pressure outside of the casing 34 is lower than the pressure inside casing 34, for example, at high altitudes. In such situations the pressure differential between the environments inside and outside the casing 34 forces the gasket 64 to work its way out from between end plate 30 and casing 34.

The ability to seal the environment within the casing alleviates the need for a breather filter and allows the disk drive of the present invention to use an internal air filtration system. The seal provided by gasket 64 is stable at pressures experienced at altitudes from 200 feet below sea level to 10,000 feet above sea level during operation of the disk drive. The internal air filter 45 has an 0.3 micron filter to provide a clean environment for the heads and disks.

Figure 5B:
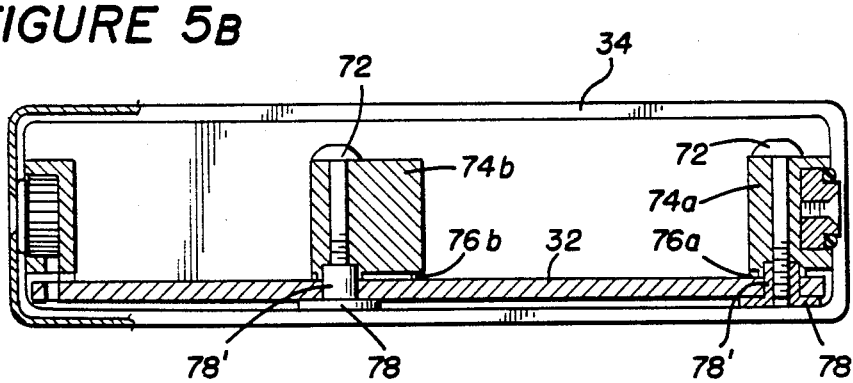
FIG. 5B is a sectional view along line 5B—5B in FIG. 5A.

As shown in FIGS. 3A and 5A-B, the base plate 32 is attached to the end plate 30 by mounting screws 72 which extend through mounting brackets 74a-b of end plate 30. Each mounting bracket 74a-b includes a boss 76a-b having an axis parallel to the plane of the end plate. The base plate 32 rests against bosses 76a-b and mounting screws 72 extend through mounting brackets 74a-b and thread into plastic nuts 78. The plastic nuts 78 are formed of a semi-rigid material, for example, Delran 500, and have a sleeve 78' which extends through the base plate 32 and contacts the bottom of the mounting brackets 74. The length of the sleeves 78' is greater than the thickness of the base plate 32 plus the depth of the boss 76. This mounting system allows the base plate to pivot with respect to the end plate about a line defined by the contact points of the bosses 76a-b and the base plate 32. The pivoting of the base plate 32 with respect to the end plate 30 prevents the base plate 32 from being twisted, flexed, or otherwise distorted when the base plate 32 and end plate 30, as a unit, are attached to casing 34, thereby engaging notch 80 in base plate 32 with attachment point 82 (FIG. 4) of casing 34. Further, the base plate 32 may be manufactured by stamping, a process which enables the base plate and all of the mounting holes therein to be manufactured in a single step. Therefore, separate steps otherwise necessary to align the mounting holes are avoided.

The structure and operation of actuator assembly 38 will be explained with reference to FIGS. 6-10. The purpose of the actuator assembly 38 is to position heads 84 with respect to the surfaces of the disks 36 by pivoting arm assembly 40. Specifically, its purpose is to position the heads 84 over individual tracks on disks 36. Arm assembly 40 includes flexures 86 for supporting heads 84, the flexures in turn being supported by actuator arm 88. Arm assembly 40 pivots on actuator post 90, including a sleeve bearing, which is fixed to the base plate 32. A coil 92 is provided on actuator arm 88 on the opposite side of actuator post 90 from heads 84. Arm assembly 40 is precisely balanced, i.e., equal amounts of weight are provided on either side of actuator post 90, so that the positioning of heads 84 is less susceptible to linear shock and vibration.

The force utilized to pivot arm assembly 40 is provided by a voice coil assembly. The voice coil assembly includes coil 92, center pole 94 which extends through coil 92, support posts 96a–b (each including lower and upper portions $96a_1$, $96b_1$, and $96a_2$, $96b_2$, respectively) for supporting center pole 94 between base plate 32 and top plate 42, first and second permanent magnets 98a–b respectively attached to the base plate 32 and the top plate 42 below and above coil 92, and top and bottom plates 32, 42. Top and base plates 42, 32 in conjunction with support posts 96a–b and center pole 94 functions as returns for the magnetic fields provided by first and second permanent magnets 98a–b. In these returns for the magnetic fields it is important that there are no air gaps between support posts 96a–b and either the base plate 32, the center pole 94, or the top plate 42; any air gap would create a discontinuity in the return, greatly reducing the strength of the magnetic field in the portion of the return isolated from the magnet by the air gap.

The first and second magnetic fields $B_1$ (shown by the solid arrows) and $B_2$ (shown by the dashed arrows) as contained by the returns are illustrated in FIG. 7. By providing returns for the first and second magnetic fields $B_1$, $B_2$, thereby containing the magnetic fields $B_1$ and $B_2$ in the returns, the magnetic field intensity is increased in the region between the center pole 94 and each of the magnets 98a–b, where the current carrying coil 92 is positioned. The force on a current carrying wire in a magnetic field is proportional to the magnetic field intensity, and is expressed by the equation $dF = idl \times B$, where F is the force, i is the current, l is the length of the wire, and B is the magnetic field. Passing a current in opposite directions in coil 92 provides respective forces $F_1$ and $F_2$ (FIG. 6A) normal to the plane of the windings of the coil and in opposite directions; these forces $F_1$ and $F_2$ pivot arm assembly 40 in opposite directions.

Crash stops are provided to limit the pivoting movement of arm assembly 40 so that heads 84 travel between selected inside and outside diameters of disks 36. An inside diameter crash stop comprises an o-ring 100 (FIG. 6A) fitted on support post $96a_1$. When the pivoting motion of arm assembly 40 places heads 84 at the inside diameter of the disks 36 a portion of the actuator arm 88 contacts inside diameter crash stop 100, thereby preventing further movement of the heads 84. FIG. 6A illustrates the arm assembly 40 in a position near the inside diameter crash stop 100. FIG. 6B illustrates the arm assembly 40 when a portion of actuator arm 88 is in contact with u-shaped spring 102 of outside diameter crash stop 44. The u-shaped spring 102 (FIG. 2) is preloaded by bending the spring around three metal dowels 104a–c. Preloading spring 102 limits the deflection of the heads to approximately 40 thousandths of an inch between the first contact between actuator arm 88 and spring 102 and the position at which motion of the arm assembly 40 is stopped.

The above-described structure of the disk drive of the present invention provides excellent protection from shock and vibration. In particular, the disk drive will withstand nonoperating shocks of 75 g's and operating shocks, without nonrecoverable errors, of 5 g's. Nonoperating vibration of 2 g's in the range of 5–500 Hz is the specified tolerable limit. Operating vibration, without nonrecoverable data, is specified at 0.15 g's for the range of 5–500 Hz.

Each of the two disks 36 has 752 tracks per surface due to the ability of the actuator assembly 38 to operate with a track density of 1000 tracks per inch. Thus, utilizing 26 blocks per track and 512 bytes per block, the disk drive of the first embodiment has an unformatted capacity of 50.1 MBytes and a formatted capacity of 40 MBytes. The actuator assembly 38 provides an average seek time of 29 ms and a track-to-track seek time of 10 ms. The average seek time is determined by dividing the total time required to seek between all possible ordered pairs of track addresses by the total number of ordered pairs addressed.

Figure 10:
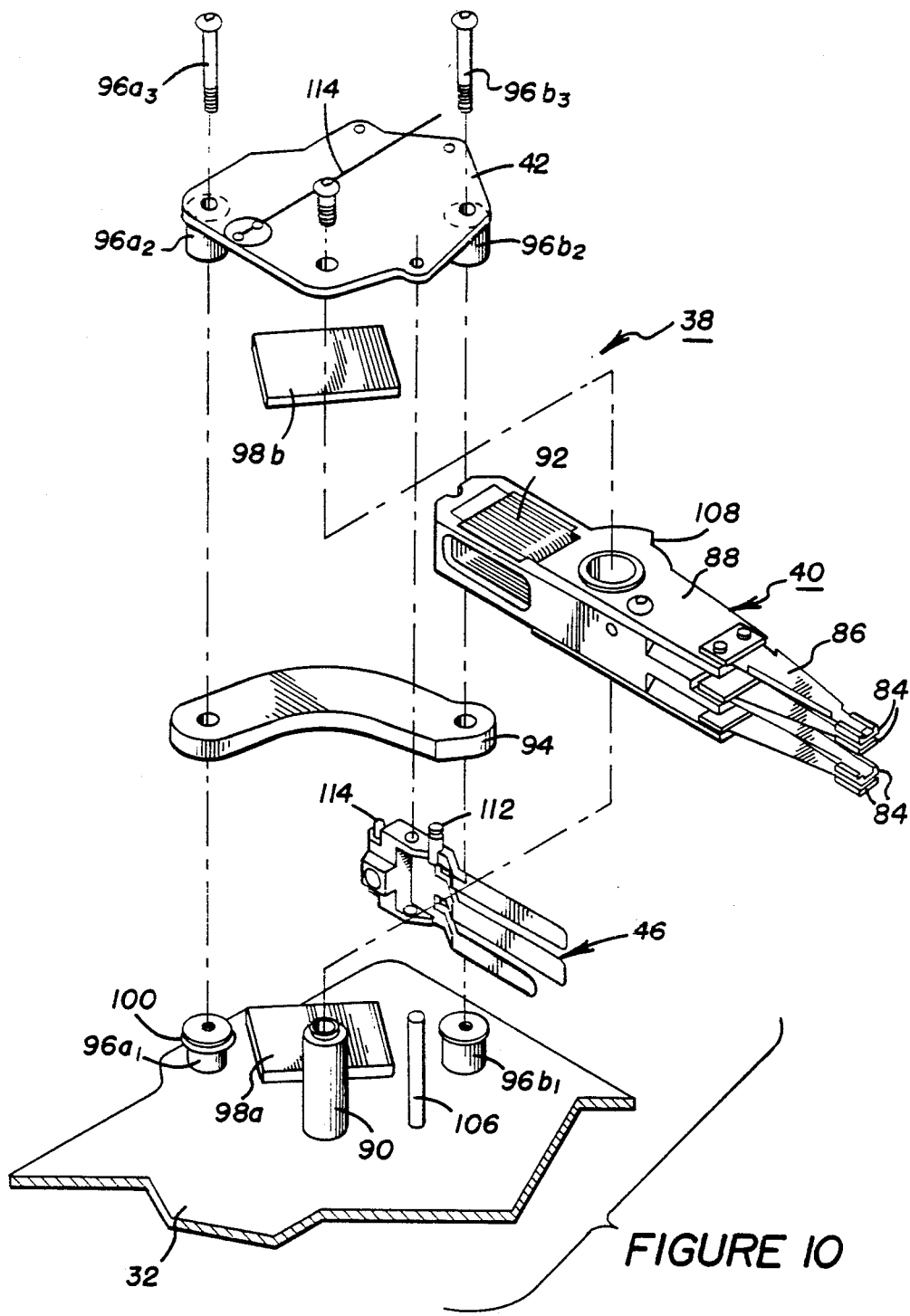

Latch mechanism 46, which locks the actuator arm in an orientation where the heads 84 are positioned at the inside diameter of the disks 36, will be described with reference to FIGS. 6, 7, and 10. The latch mechanism 46 is balanced to pivot on metal dowel 106 which is affixed to the base plate 32. When the air flow generated by the rotation of the disks 36 is not great enough to overcome the biasing force of spring 110, which acts against spring post 112, the latch mechanism in 46 is held in the locked position by spring 110, as shown in FIG. 6A. When latch 46 is in the locked position, latch tab 114 of the latch 46 contacts latch surface 108 of actuator arm 88, thereby pinning the arm assembly 40 between the latch tab 114 and the inside diameter crash stop 100. Accordingly, the arm assembly 40 is locked in an attitude where heads 84 are over nondata areas at the inside diameter of disks 36. The voice coil assembly pivots the arm assembly 40 to the position where the heads 84 are at the inside diameter of the disk before the rotational speed of the disks 36 is decreased to the point where the heads 84 land on the disks 36. Thus, the heads 84 land only on the nondata area at the inside diameter of the disks 36.

When the air flow generated by the rotation of the disks 36 is large enough to pivot the latch mechanism 46 to the position shown in FIG. 6B, the arm assembly 40 is unlocked and able to pivot. To provide an air flow large enough to pivot latch mechanism 46, outside diameter crash stop 44 and filter assembly 45 are shaped to maintain a circular air flow inside the casing when the disks 36 are rotating, by preventing the air flow from escaping from the region over the disks 36. In addition, filter assembly 45 has an air intake (not shown) to pass the air through a filter medium (not shown), and the air exiting the filter assembly 45 passes through a venturi, giving the exiting air a large velocity and directing the existing air flow directly at the latch mechanism 46. The hysteresis of the spring force provided by spring 110 is carefully selected so that the airflow generated by the rotation of disks 36 overcomes the biasing force of spring 110 and pivots latch 46 to the unlocked position when the disks are rotating well below the full rotational speed of, for example, 3600 RPMs, and so that spring 110 biases the latch 46 to the locked position when the rotational speed of disks 36 slows just below full rotational speed; this relationship assures that the latch mechanism 46 will always be unlocked due to the excess airflow available for unlocking the latch mechanism 46, and that the arm assembly 40 will be locked at the inside diameter of the disks 36 when the heads 84 land on the disks 36.

A flexible circuit assembly 116 for carrying electrical signals from header 56 to heads 84 and actuator assembly 38 will be described with reference to FIGS. 6A, 8A–B and 9A. The flexible circuit assembly is separated into three portions. A first portion 118 carries current to coil 92 of actuator assembly 38. A second portion 120 is a ground plane which separates the current carrying portion 118 from a third data carrying portion 122. The data carrying portion 122 provides signals to heads 84 for recording information on disks 36 and carries signals from the heads to the printed circuit assembly 28, via header 56 and bus 52, when reading data from disks 36. Interference with the relatively weak data signals which would otherwise be caused by the larger currents necessary to operate the actuator assembly 38 passing through the first portion 118 of the flexible circuit assembly 116 is prevented by the provision of ground plane 120.

The flexible circuit assembly 116 is parallel to the base plate at the point where it is connected to header 56; however, the flexible circuit assembly 116 passes through a 90 degree bend so that it is separated into segment 116a which is parallel to the base plate and segment 116b which is perpendicular to the base plate. Segment 116b of the flexible circuit assembly 116 is shown from the top in FIGS. 6A and 8A and from the side in FIG. 9A.

Any force exerted on arm assembly 40 by flexible circuit assembly 116 affects the function of actuator assembly 38 in positioning heads 84 with respect to disk 36, particularly the track following and seek functions described in the above-referenced applications entitled DISK DRIVE SOFTWARE SYSTEM ARCHITECTURE and DISK DRIVE SOFTWARE SYSTEM ARCHITECTURE UTILIZING IMBEDDED REAL TIME DIAGNOSTIC MONITOR. The force provided by the voice coil assembly is corrected to compensate for the force exerted by flexible circuit assembly 116. As the force exerted by flexible circuit assembly 116 increases, the variation of the force over the range of motion of arm assembly 40 will have a greater variance, and therefore accurate track following and seeking become more difficult. Accordingly, the radius R of the curve in section 116b of the flexible circuit assembly 116 (FIG. 6A) must be large enough so that the flexible circuit assembly 116 does not exert a large force against arm assembly 40 to which it is attached.

In order to protect the disks 36—particularly the magnetic recording medium on the disks—from any magnetic fields which might be created by currents passing through leads 124, which carry signals from the flexible circuit assembly to the heads 84, leads 124 run on opposite sides of flexures 86 from the disk. In addition, at the point where the flexures are attached to the actuator arm 88 the leads 124 are positioned in an indentation or groove provided in the edge of the actuator arm 88. A groove in the actuator arm is shown in the partial cutaway view of FIG. 8B. Thus, the disks 36 are always protected from the leads 124 by flexures 86 or by actuator arm 88.

Figure 11:
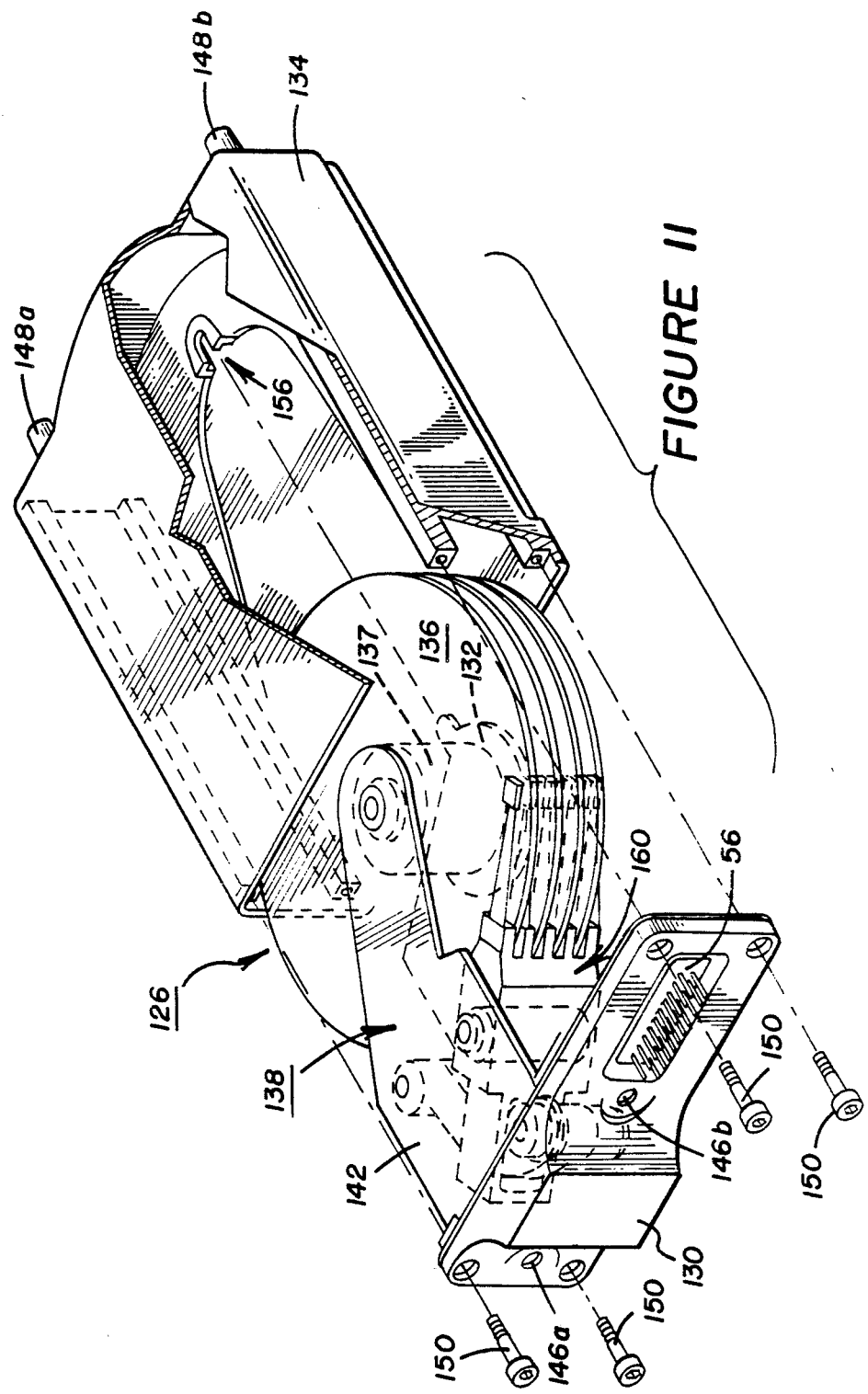

A disk drive according to a second embodiment of the present invention will be described with reference to FIGS. 11–19. FIG. 11 shows the disk assembly 126 which is mounted on a shock frame (not shown) similar to shock frame 27 of the first embodiment. A printed circuit assembly (not shown) similar to printed circuit assembly 28 is also mounted on the shock frame. The mounting of hard disk assembly 126 on a shock frame and the electrical connections between the hard disk assembly 126 and a printed circuit assembly (not shown) are provided in a similar manner to those described with respect to the first embodiment of the present invention. Therefore, these aspects of the second embodiment of the present invention will not be described in detail.

The disk drive of the second embodiment, having four (4) disks, is slightly taller (1.625"; 4.13 cm) than the disk drive of the first embodiment; however, the length and width remain the same. The weight is 2.0 pounds. The specified limits of shock and vibration for the disk drive of the second embodiment are the same as that of the disk drive of the first embodiment.

Disk assembly 126 of the second embodiment includes an end plate 130, a base plate 132 mounted to the end plate 130, and a casing 134 mounted to and forming a seal with the end plate 130 to provide a controlled environment within the casing 134. In the second embodiment, four hard disks 136 are rotatably mounted on the base plate via a motor 137 (FIG. 16) and actuator assembly 138 including arm assembly 140 is mounted between the base plate 132 and a top plate 142 which is mounted to the base plate 132. In the second embodiment, top plate 142 and the base plate 132 serve to rotatably support the disks 136.

The interrelation of the end plate 130, the base plate 132, and the casing 134 will be described with respect to FIGS. 11–14. End plate 130 is fastened to the casing 134 by four screws 150 which pull the casing 134 towards the end plate 130. As the casing 134 is pulled toward the end plate 130, a gasket 152 (FIGS. 13A–B), positioned between the end plate 130 and the casing 134, is compressed and is squeezed into grove 153 in end plate 130. Squeezing gasket 152 into groove 153 holds the gasket in place and eliminates the need for the gasket retainers 70 utilized in the first embodiment. Pulling the cover 134 toward the end plate 130 also engages extension 154 of the base plate 132 with mounting point 156 in casing 134 (FIGS. 11–12), particularly with a plastic insert 157 provided in mounting point 156.

Figure 14:
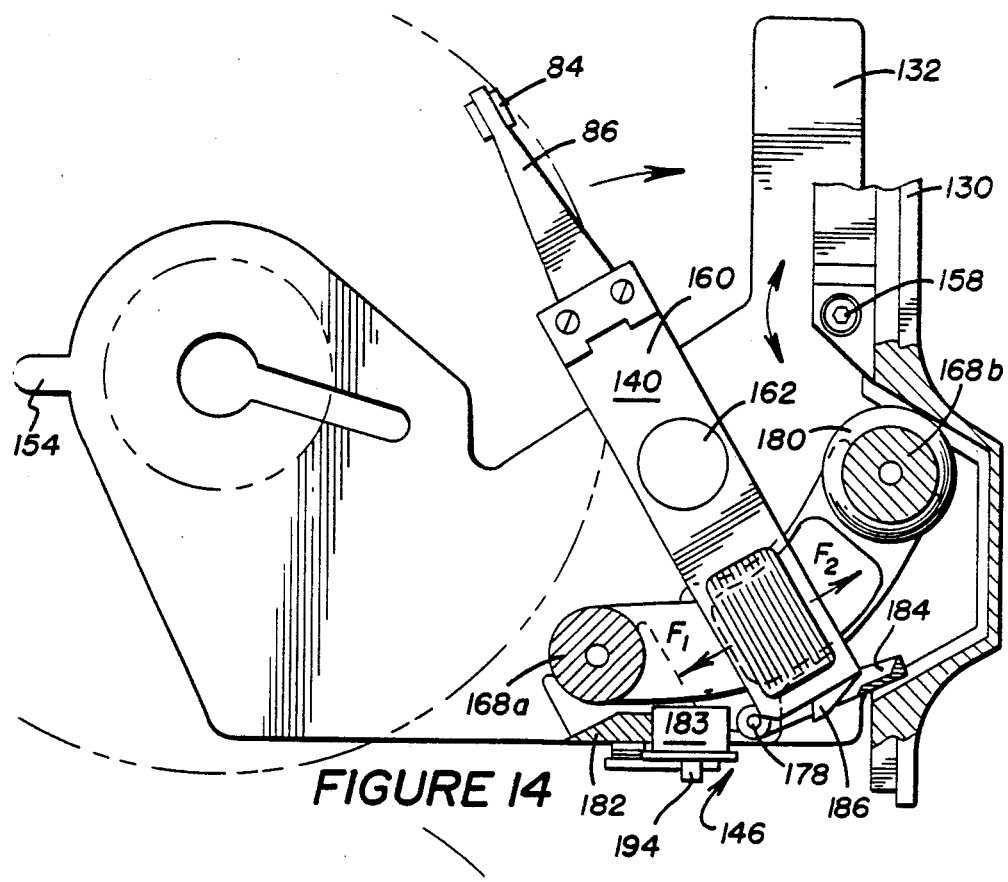

To ensure that an even amount of pressure is applied at all points along circumference of gasket 152, the base plate 132 pivots with respect to the end plate 130 in the plane of the base plate. The pivoting of the base plate 132 is achieved by mounting the base plate 132 to the end plate 130 with a single mounting screw 158 (FIG. 14). The seal provided by gasket 154 is stable at pressures experienced at altitudes from 200 feet below sea level to 10,000 feet above sea level.

Figure 15:
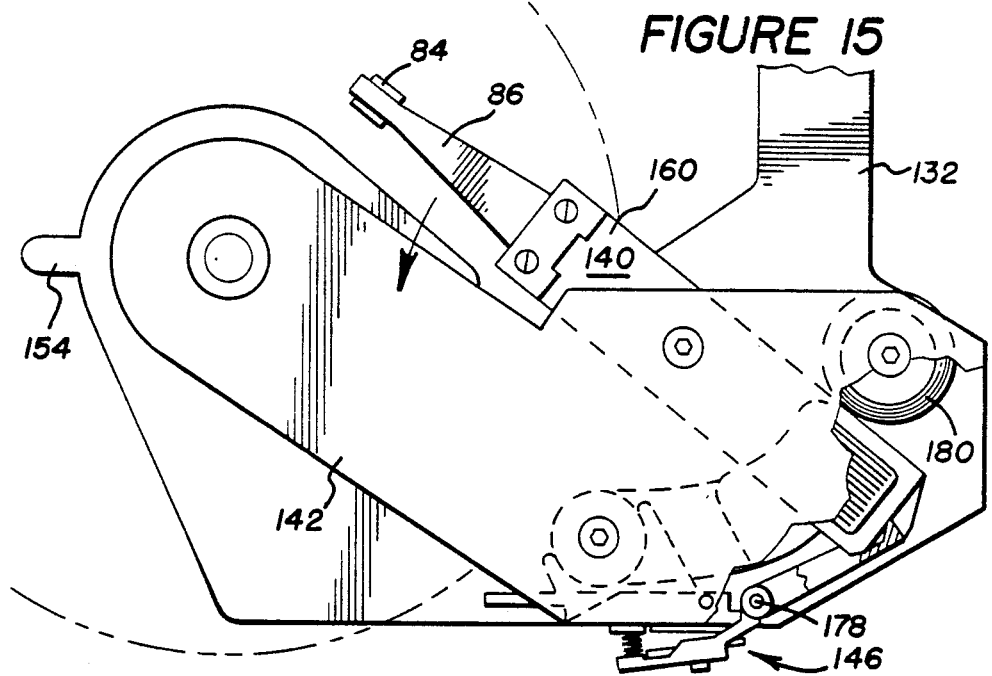
Figure 16:
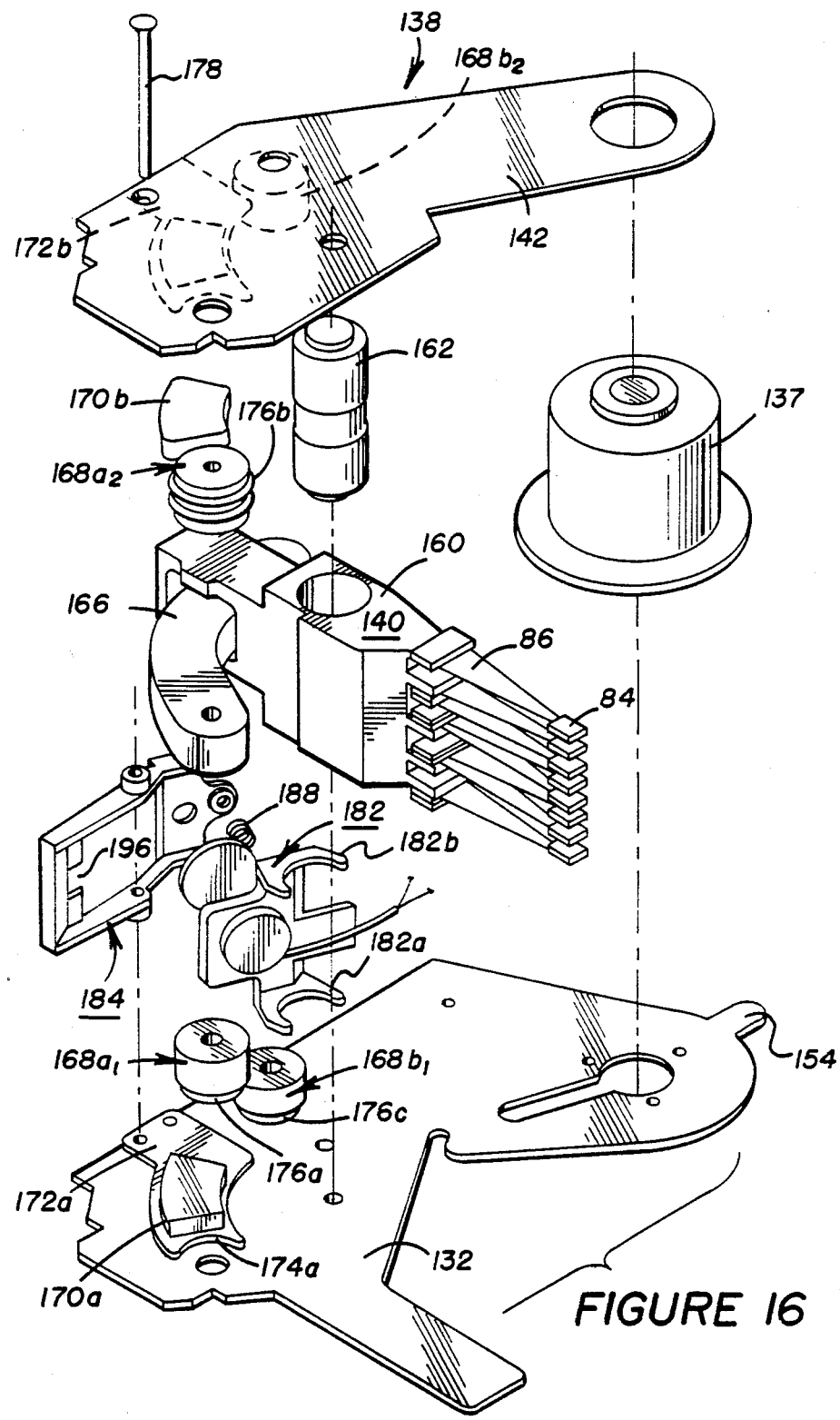

The actuator assembly 138 of the second embodiment of the present invention, which is similar in structure and function to the actuator assembly 38 of the first embodiment of the present invention, will be discussed with reference to FIGS. 14–16. Again, the purpose of actuator assembly 138 is to position heads 84 over individual tracks on the disks 136; eight heads 84, one for each side of the four disks 136, are used in the second embodiment. Arm assembly 140 includes heads 84, flexures 86 for supporting the heads 84, and an actuator arm 160 for supporting the flexures 86. The arm assembly 140 pivots on a bearing 162 which is supported between the base plate 132 and the top plate 142. A coil 164 (shown in cross section in FIG. 18) is provided by actuator arm 160 on the opposite side of bearing 162 from heads 84. As in the first embodiment, the arm assembly 140 is precisely balanced so that it pivots easily on bearing 162.

A voice coil assembly for pivoting arm assembly 140 includes coil 164, center pole 166 which extends through coil 164, center pole supports $168a_{1-2}$-$b_{1-2}$, first and second permanent magnets 170a–b, and the top and base plates 142, 132. Returns for the magnetic fields of first and second permanent magnets 170a–b are provided by the center pole supports 168, top and base plates 142, 132, and center pole 166. Passing a current in opposite directions in coil 164 provides forces $F_1$ and $F_2$ (FIG. 14) which pivot arm assembly 140 in opposite directions. The paths of the magnetic fields are similar to the magnetic field paths shown in FIG. 7 with respect to the first embodiment.

A flexible circuit assembly (not shown), similar to flexible circuit assembly 116 of the first embodiment, carries electrical signals from header 56 (FIG. 11) to coil 164 and heads 84.

The pivoting motion of arm assembly 140 is limited by dowel 178 which functions as an outside diameter crash stop, and by an o-ring 180 fitted around center pole support $168a_2$ which functions as an inside diameter crash stop. FIG. 14 shows the arm assembly 140 rotated to a position where the heads 84 are at the outside diameter of the disks 136 and actuator arm 160 is in contact with dowel 178. FIG. 15 shows actuator arm 160 in contact with o-ring 180 and the heads 84 at the inside diameter of disks 136.

Actuator assembly 138 provides an average seek time of 25 ms and a track to track seek time of 8 ms with 1150 tracks per inch. Each disk has 776 tracks per surface with 33 blocks per track and 512 bytes per block, providing a formatted capacity of 100 MBytes.

In the embodiments of the present invention described herein the arm assembly 40, 140 is pivotably mounted between the top plate 42, 142 and the base plate 32, 132. Nevertheless, other arrangements of the arm assembly 40, 140 are contemplated; for example, the arm assembly 40, 140 could be mounted to be translated along its longitudinal axis by a linear motor.

During the manufacture of a disk drive in accordance with the present invention, efforts must be made to prevent foreign matter from being enclosed in the controlled environment within the casing 34, 134. One source of contaminating particles is the permanent magnets 98, 170 which, due to their strength, attract pieces of magnetic material. The danger of the presence of magnetic material in the disk assembly 26, 126 is twofold: First, any particle which is present on the disk can cause one of the heads 84 to "crash." Second, a magnetic particle, if in close proximity with the disks 36, 136, can destroy data which is stored on the disk in magnetic form. Accordingly, in the second embodiment of the present invention, first and second permanent magnets 170a–b are attached to first and second magnet carriers 172a–b (FIG. 16). One end of each of the magnet carriers 172a–b has a c-shaped end 174 which engage indentations 176a–b in center pole supports $166a_{1-2}$. The other end of magnet carriers 172a–b are held in position by metal dowel 178 which extends through the top plate 142 and the base plate 132. Further, screws (not shown) secure the magnet carrier 172a–b to the top and base plates. The use of magnet carriers 172a–b allows the first and second magnets 170a–b to be inserted into the actuator assembly 138 when the assembly of the disk assembly 126 is close to completion, thus limiting the possibility that the first and second magnets 170a–b will attract magnetic particles prior to the sealing of the hard disk assembly 126.

Electromagnetic latch 146 of the second embodiment of the present invention will be described with reference to FIGS. 16-19. The electromagnetic latch 146 includes a latch mount 182, a latch bracket 184 which pivots on metal dowel 178 and engages latch tab 186 on actuator arm 160, and a spring 188 for biasing the latch bracket 184 to the locked position. Latch mount 182 has two c-shaped sections 182a–b which engage indentations 176c–d in respective ones of the upper and lower center pole supports $168b_{1-2}$. Latch mount 182 is further positioned by dowel 178. Thus, dowel 178 has three functions It serves as the outside diameter crash stop, it serves as the pivot for latch bracket 184, and it serves to position the latch mount 182.

An electromagnet, including a coil housing 190 formed of a magnetically permeable material and mounted on latch mount 182, and coil 192, is used to pivot latch bracket 184 to the unlocked position. Coil housing 190 has an outer wall 190a and a center post 190b. When a current is passed through coil 192, the magnetic field generated by the coil housing 190 attracts swivel plate 194; swivel plate 194 is mounted on the latch bracket 184 so that it can swivel in all directions and be flush with the outer wall 190a when the swivel plate 194 is captured by the electromagnet Contact between the entire outer wall 190a and swivel plate 194 is necessary to provide reliability in the capture of the swivel plate 194. The center post 190b of the coil housing 190 does not extend as far as the outer wall 190a, and a small air gap exists between the center post 190b and the swivel plate 194 to allow the electromagnet to release the swivel plate 194. The air gap is on the order of 1-6 thousandths of an inch—preferably 2-4 thousandths of an inch. Without the air gap between the center post 190b and the swivel plate 194, the swivel plate 194 would serve as a magnetic return and it would be extremely difficult to release the swivel plate 194 from the electromagnet. A high DC voltage is applied to the electromagnet for a short time to capture the swivel plate 194, and the applied voltage is reduced to a small capture maintenance level. Thus, this structure is low in power consumption and heat dissipation. Further, despite the low power consumption of the electromagnet it is highly reliable in its capture, holding, and release of swivel plate 194, and thus latch bracket 184.

Latch bracket 184 pivots on dowel 178 and has first and second arms 184a and 184b on opposite sides of the pivot. Latch bracket 184 is designed so that it is out-of-balance with respect to the point at which it pivots on dowel 178 to enhance the locking characteristics during shipping and for nonoperational shocks. Balancing the latch bracket provides the latch mechanism 146 with positionally independent operation. Swivel plate 194 is supported by the second arm 184b and the first arm 184a contacts latch tab 186. Latch tab 186 has a sloped portion 186a which allows the actuator arm 160 to pivot past latch bracket 184 when the latch bracket 184 is in the locked position; in particular, latch bracket 184 rides up the sloped portion, pivoting against the force of spring 188, as the actuator arm 160 pivots towards the inside crash stop 180. FIGS. 15 and 18 illustrate the actuator arm 160 locked in position by latch bracket 184, while FIG. 14 illustrates actuator arm 160 pivoted all the way to the outside crash stop 178 with latch bracket 184 in the unlocked position. A notch 196 is provided in first arm 184a of latch bracket 184 to allow latch tab 186 to clear the latch bracket 184 when actuator arm 160 pivots.

The particular embodiment of the latch mechanism 145 described above includes an electromagnet and a swivel plate 194 for pivoting latch bracket 184 to the unlocked position However, other mechanisms for pivoting the latch bracket could be employed, for example, a solenoid.

The many features and advantages of the disk drive of the present invention will be apparent to those skilled in the art from the Description of the Preferred Embodiments. Thus, the following claims are intended to cover all modifications and equivalents falling within the scope of the invention.

What is claimed is:

1. A disk drive, comprising:
   a shock frame having mounting points;
   control means for generating control signals; and
   a hard disk drive assembly, mounted on said shock frame at said mounting points, comprising:
     an end plate having a peripheral edge,
     a gasket provided on said peripheral edge of said end plate,
     a casing having an opening, said casing being attached to said end plate so that said opening of said casing engages said gasket to provide a sealed environment within said casing,
     a planar base plate having a first end mounted to said end plate so that said base plate is substantially perpendicular to said end plate and a second end mounted to said casing, said base plate residing in said sealed environment,
     a top plate mounted on said base plate,
     means, rotatably supported by said base plate, for storing information,
     rotating means, responsive to said control signals, for rotating said disk means,
     read and record means, responsive to said control signals, for reading information from said means for storing and recording information on said means for storing,
     means for transferring said control signals from the control means to the environment within said casing, and
     flexible circuit means for electrically interconnecting said means for transferring with said read and record means and said rotating means.

2. A disk drive according to claim 1, wherein:
   said read and record means comprises:
     transducer means for interacting with said disk means to read and record information, and
     positioning means for positioning said transducer means with respect to said disk means;
   said means for transferring is provided in said end plate; and
   said flexible circuit electrically interconnects said header with said transducer means and said positioning means.

3. A hard disk drive assembly, comprising:
   an end plate;
   a casing attached to said end plate;
   a gasket provided between said casing and said end plate to form a seal and to provide a sealed environment isolated from ambient conditions within said casing;
   a planar base plate, said base plate having a first end semirigidly mounted to said end plate and a second end attached to said casing, said base plate residing in the sealed environment;
   a planar top plate mounted on said base plate;
   a disk assembly mounted on said base plate, said disk assembly including a disk and means for rotating said disk; and
   read and record means supported by said top and base plates for reading information from said disk and recording information on said disk.

4. A disk drive assembly according to claim 3, wherein said base plate is semi-rigidly mounted to said end plate so that said base plate pivots with respect to said end plate in the plane of the base plate.

5. A disk drive assembly according to claim 3, wherein said disk assembly comprises a plurality of disks and means for rotating said disks.

* * * * *